E. B. MOSELEY.
INDICATOR FOR FILING APPLIANCES.
APPLICATION FILED OCT. 30, 1911.
1,118,039.
Patented Nov. 24, 1914.
3 SHEETS—SHEET 1.
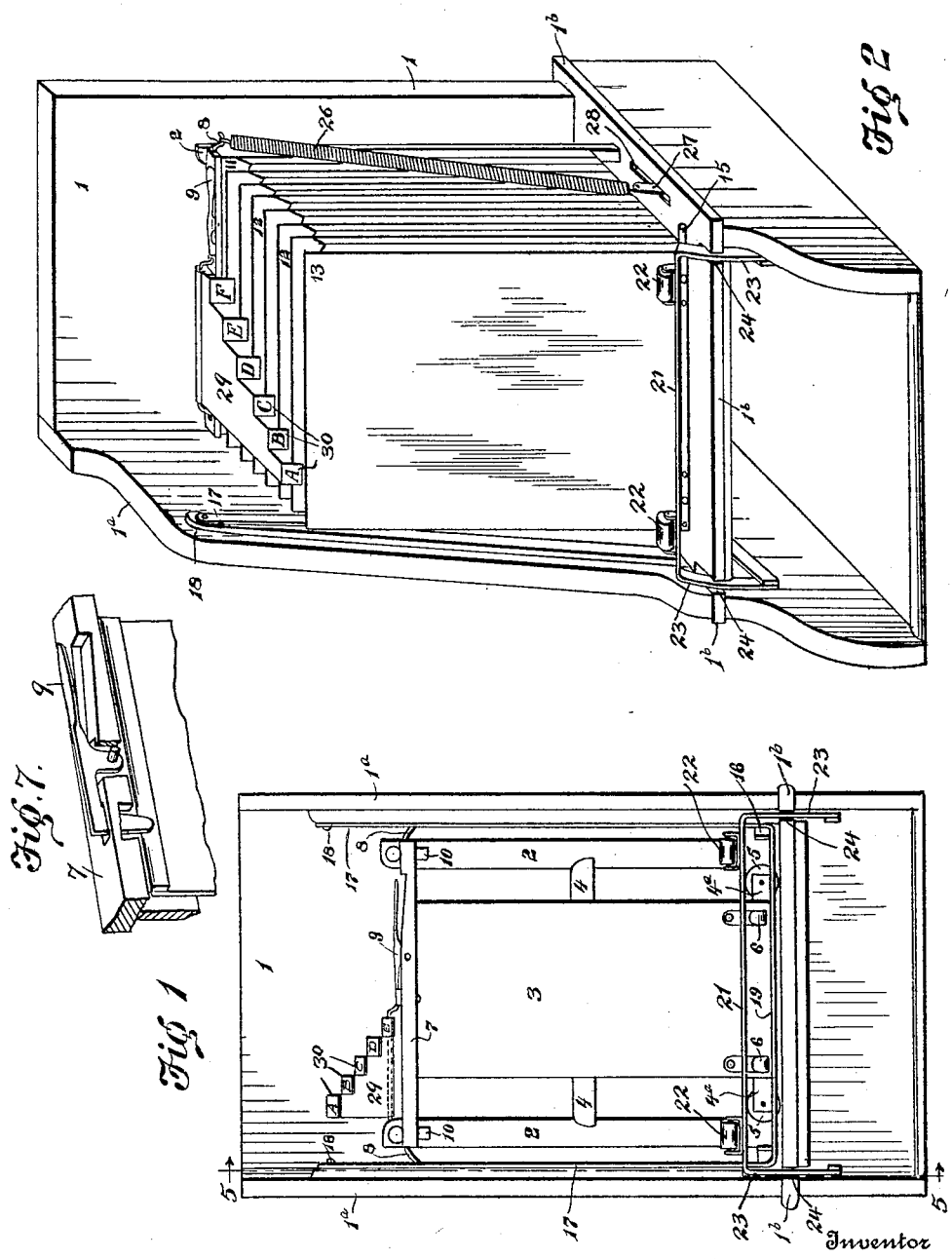
Witnesses
R. F. Kohl
Ruth A. Miller
Inventor
Emerson B. Moseley
By Harry Frease
Attorney E. B. MOSELEY.
INDICATOR FOR FILING APPLIANCES.
APPLICATION FILED OCT. 30, 1911.
1,118,039.
Patented Nov. 24, 1914.
3 SHEETS—SHEET 2.
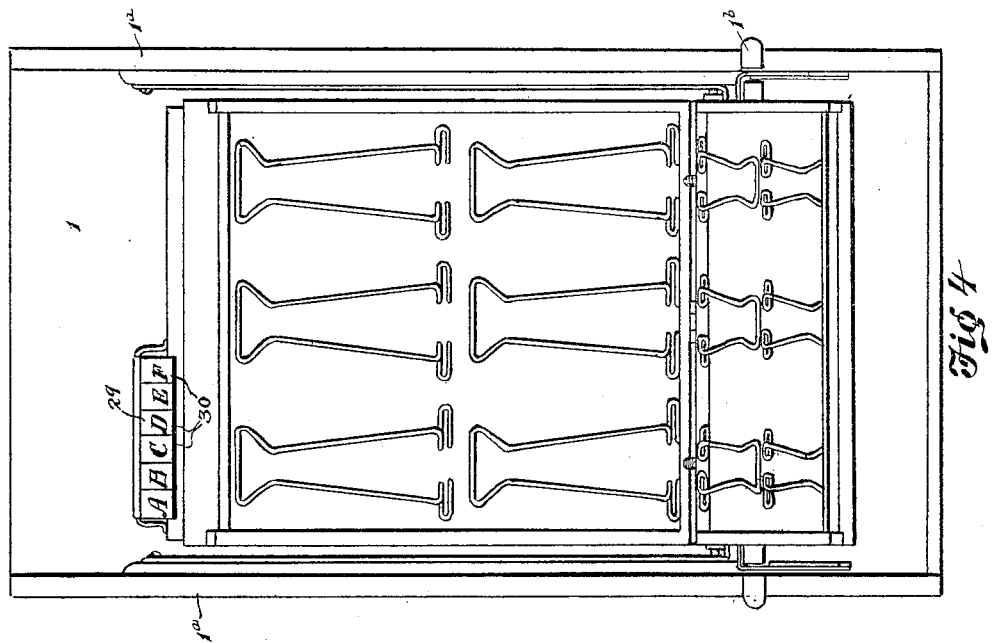
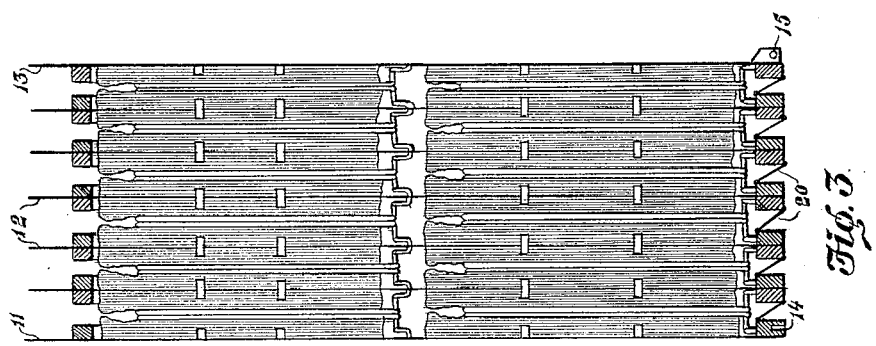

E. B. MOSELEY.
INDICATOR FOR FILING APPLIANCES.
APPLICATION FILED OCT. 30, 1911.
1,118,039.
Patented Nov. 24, 1914.
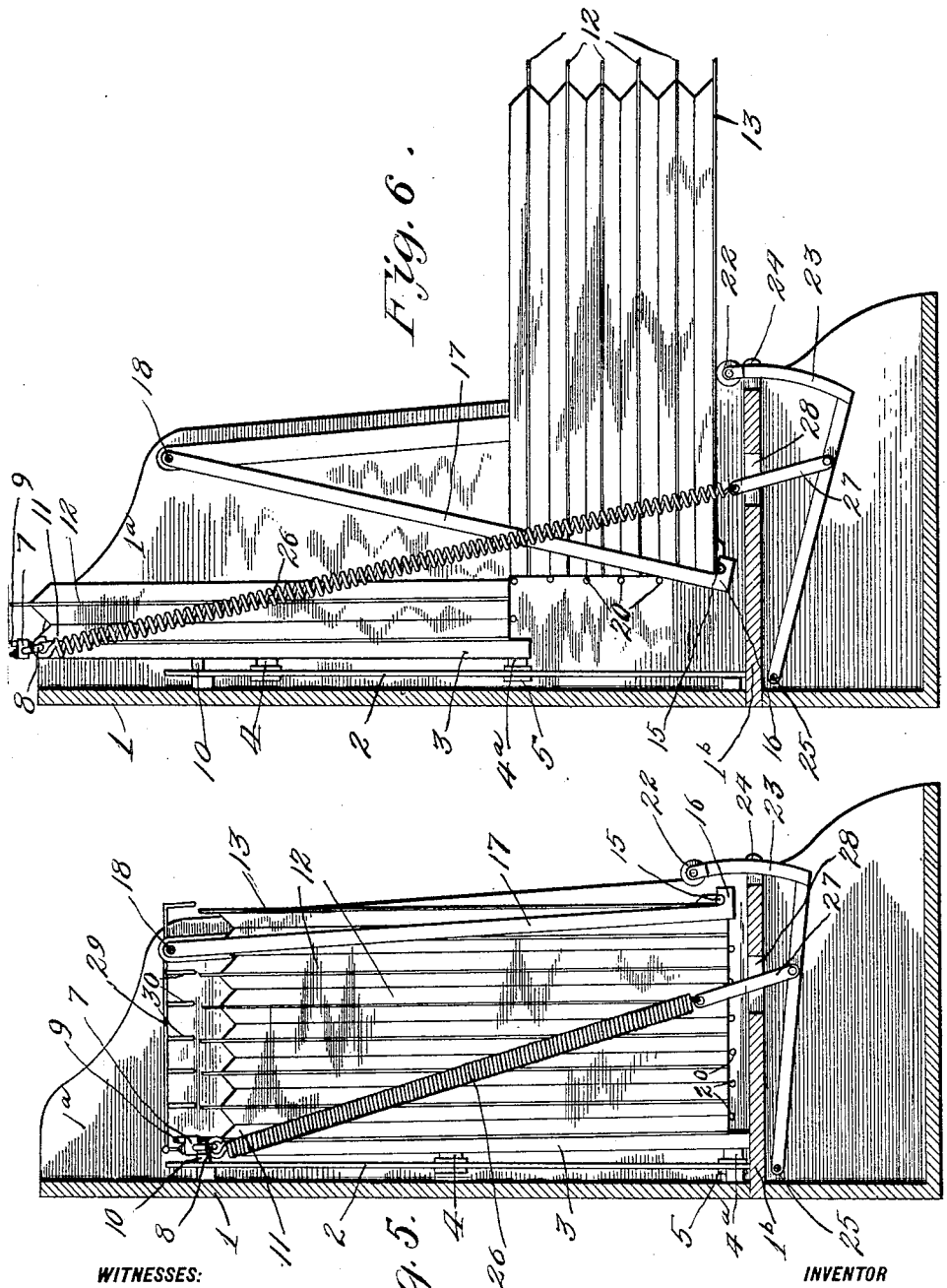

UNITED STATES PATENT OFFICE.

EMERSON B. MOSELEY, OF ALLIANCE, OHIO, ASSIGNOR, BY MESNE ASSIGNMENTS, TO THE McCASKEY REGISTER COMPANY, (INCORPORATED IN 1914,) OF CANTON, OHIO, A CORPORATION OF OHIO.

INDICATOR FOR FILING APPLIANCES.

1,118,039.  Specification of Letters Patent.  Patented Nov. 24, 1914.

Original application filed June 20, 1911, Serial No. 634,268. Divided and this application filed October 30, 1911. Serial No. 657,587.

*To all whom it may concern:*

Be it known that I, EMERSON B. MOSELEY, a citizen of the United States, residing at Alliance, in the county of Stark and State of Ohio, have invented a certain new and useful Indicator for Filing Appliances, the same being illustrated and described, but not claimed, in my application for Letters Patent filed June 20, 1911, Serial No. 634,268, of which application this is a divisional part, and of which invention the following is a specification.

The invention relates to an appliance especially adapted for filing bills of sales or accounts, as of a retail merchant, and more particularly to that class of appliances containing a series of frames or leaves normally located uprightly face to face in a rectangular pack, the frames being hinged or jointed together at the lower ends, so that they can be rotated forward to a prone position face to face, which rotation exposes and gives access to the faces of the several frames.

The object of the invention is to provide means for indicating or indexing the contents of the several frames, which is attained by providing an overhanging plate having a series of depending index flanges, arranged in echelon, so that each flange is located above a corresponding upright frame to indicate the contents thereof.

The present embodiment of the invention, thus set forth in general terms, is illustrated in the accompanying drawings, forming part hereof, in which—

Figure 1 is a front elevation of the case with the pack of frames removed therefrom; Fig. 2, a perspective view of the case with the pack of frames therein, and having one side broken away to show details; Fig. 3, a sectional view of the pack of frames in upright position, showing bunches of bills therein, and the hinged ends expanded; Fig. 4, a front elevation of the filing appliance with the pack of frames therein, showing the foremost frame rotated forward to its prone position; Fig. 5, a section of the case on line 5—5, Fig. 1; showing the pack of frames in the case in normal upright position; and Fig. 6, a similar section of the case showing the pack of frames therein with a number of the frames rotated forward to a prone position; Fig. 7 is a detail perspective view showing the means for securing the upper end of the rearmost frame in upright position.

Similar numerals refer to similar parts throughout the drawings.

The case of the appliance is preferably made with the back and side walls 1 and $1^a$, and the transverse partition or shelf $1^b$ locately slightly above the lower ends of the walls, and the upright guides or ways 2 are secured in the case, preferably to the back wall thereof, as shown. The sliding bracket 3 is provided with the lateral arms 4 and $4^a$, adapted to engage and travel along the ways, either with or without the flanged wheels 5 shown in the arms $4^a$; which arrangement permits the bracket to slide or travel upward and downward in the case.

The body of the sliding bracket is preferably inclined slightly backward from below upward, and the hooks 6 are provided on the forward side of its lower end, while the forwardly and laterally overhanging bar 7 is secured on its upper end, to the ends of which overhanging bar are secured the hooks 8, and intermediate the ends thereof is pivoted the latch 9. The stops 10 may be provided on the ways, or the shelf $1^b$ can be utilized, to limit the downward movement of the bracket.

The frames or leaves 11, 12 and 13, are normally assembled in a rectangular pack, and the rearmost frame 11 is provided with suitable sockets 14 in its lower end, to engage the hooks 6 on the lower end of the sliding bracket, and the upper end of the same frame is adapted to be engaged by the latch 9, thus detachably securing the rearmost frame in an upright position to the sliding bracket, so that it will travel upward and downward therewith.

The laterally extending pivots 15 are provided on the lower end of the foremost frame 13, preferably on the forward side thereof; and swinging bearings 16 for these pivots are carried by the pendent links 17, the upper ends of which links are pivoted or otherwise supported on the side walls of the case as at 18. The lower ends of the links 17 are preferably connected by the yoke 19, thus forming a U-shaped bail in which the frames are adapted to operate.

The frames of the pack are jointed together at the lower ends by the hinges 20, and it is evident that when the pack is uprightly positioned it can be placed in the case by engaging the sockets 14 in the lower end of the rearmost frame with the hooks 6 on the lower end of the sliding bracket, and by engaging the upper end of the same frame with the latch on the upper end of the bracket; and that by engaging and supporting the lateral pivots on the lower end of the foremost frame in the swinging bearings of the pendent links, all the frames, except the rearmost one, can be severally or together rotated to a prone position, and that in so doing the pivot support of the foremost frame will swing or oscillate rearward, according to the number of frames rotated, and that the upright frames will, at the same time, be moved upward a corresponding distance; and vice versa.

A counterbalancing support, in the form of the cross-bar 21 with the bearing rollers 22 thereon, is preferably provided for the forwardly rotated frames, which cross-bar is depressibly connected to the case as by means of the arms 23 on the ends, which arms extend downwardly through the slots 24 in the forward edge of the shelf 1$^b$, and have their rear ends pivoted to the side walls 1$^a$ of the case at 25.

The expansion springs 26 are connected above to the hooks 8 on the ends of the overhanging bracket bar 7, and at their lower ends to the pivot arms of the depressible support, as by means of the links 27 extending through the slots 28 in the shelf 1$^b$, so that a depression of the cross-bar 21 operates against the resistance of these springs.

The roller bearings 22 on the cross-bar 21 are normally located in front of the lower end portion of the foremost frame, and it is evident that when one or more frames are rotated forward the face of the foremost frame will impinge these rollers and force the cross-bar downward against the action of the expansion springs until the cross-bar is stopped by contact with the shelf 1$^b$, and at the same time the frame will travel rearward on the rollers; and furthermore that the swinging pivot bearing of the foremost frame serves as a fulcrum, and the hinge connections between the lower ends of the frames serve as knuckle joints, by means of which the upright frames are raised upward as the several frames are rotated forward, which upward movement is likewise against the action of the expansion springs, the pull of which is thus increased according to the number of frames which are rotated forward. It is also evident that, as the several frames are rotated forward, the foremost frame will travel rearward on the roller bearing supports, so that the action of the expansion spring, operating through the roller bearings, supports the prone frames at a varying distance forward from the fulcrum formed by the swinging bearings, depending upon the number of frames which have been rotated forward, whereby the expansion springs are rendered more effective to draw the forwardly rotated frames into their upright position after they have been started upward to pass the dead center formed by the knuckle joint between the respective frames.

The index plate 29 is preferably hinged to the overhanging cross-bar 7 on the upper end of the sliding bracket 3, which plate normally extends forward and overhangs the upper ends of the frame when the same are inserted in the case in upright position. The forward edge of the index plate is notched in the form of steps, and from the forward edges of the notches are provided the depending flanges 30 which are arranged in echelon to overhang the upper end edge of the respective frames. The several flange faces are marked by suitable characters as A, B, C, D, etc., to indicate the contents of the corresponding frame, and it is evident that the same can be readily located and grasped by placing the finger alongside the face of the corresponding flange. It will be understood that the index plate is preferably arranged to be rotated upward on its hinged connection with the sliding bracket, when the pack of frames is being removed from or re-inserted in the case.

The improved form of spring clips and hinged joints for the frames, which are illustrated but not described in detail or claimed herein, are made the subject-matter of two separate applications for Letters Patent filed herewith as divisions of said original application Serial No. 634,268.

I claim:

1. An appliance including a bracket, a pack of normally-upright forwardly-rotatable frames on the bracket, a plate on the bracket overhanging the upper ends of the frames, having its forward edge notched in steps, there being depending flanges on the forward edge of the plate laterally arranged in echelon to correspond to respective frames, and index references on the flanges indicating the corresponding frame.

2. An appliance including a bracket, a pack of normally-collocated rotatable frames on the bracket, a plate on the bracket adjacent to the free ends of the frames, having its forward edge notched in steps, there being flanges on the edge of the plate arranged in echelon to correspond to respective frames, and index references on the flanges indicating the corresponding frame.

3. An appliance including a bracket, a pack of normally-upright forwardly-rotatable frames on the bracket, a plate on the bracket overhanging the upper ends of the frames, having its forward edge notched in steps, depending index flanges on the forward edge of the plate laterally arranged in echelon to correspond with respective frames indicating the corresponding frame.

4. An appliance including a bracket, a pack of normally-collocated rotatable frames on the bracket, a plate on the bracket adjacent to the free ends of the frames, having its forward edge notched in steps, there being index flanges on the edge of the plate arranged in echelon to correspond with respective frames indicating the corresponding frame.

5. A filing appliance comprising a series of frames, means for supporting the frames and permitting their individual and collective oscillation, and an index device arranged adjacent to the free ends of the frames of the series, and having a series of index faces arranged one in front of the other and each adapted to be disposed adjacent to the free end of one of said frames when said frame is in its normal position.

EMERSON B. MOSELEY.

Witnesses:
RUTH A. MILLER,
RAY F. KOHL.

Copies of this patent may be obtained for five cents each, by addressing the "Commissioner of Patents, Washington, D. C."